United States Patent [19]

Pompei et al.

[11] Patent Number: 4,636,091
[45] Date of Patent: Jan. 13, 1987

[54] RADIATION DETECTOR HAVING TEMPERATURE READOUT

[75] Inventors: Francesco Pompei, Wayland; Shiraz Daya, Franklin, both of Mass.

[73] Assignee: Exergen Corporation, Natick, Mass.

[21] Appl. No.: 750,524

[22] Filed: Jun. 27, 1985

[51] Int. Cl.⁴ .......................... G01J 5/18; G01K 1/20
[52] U.S. Cl. .................................. 374/124; 250/342; 250/571; 356/43; 356/380; 374/169
[58] Field of Search .............. 374/124, 153, 126, 128, 374/169; 250/342, 338, 571; 33/266; 350/319; 354/481; 358/113

[56] References Cited

U.S. PATENT DOCUMENTS

| | | | |
|---|---|---|---|
| 2,029,476 | 2/1936 | Githens | 33/266 X |
| 2,484,735 | 10/1949 | Rath | 354/481 X |
| 3,232,192 | 2/1966 | Stimson | 354/481 X |
| 3,321,265 | 5/1967 | Clare et al. | 350/319 |
| 3,392,282 | 7/1968 | Astheimer | 374/126 |
| 3,444,739 | 5/1969 | Treharne | 374/128 |
| 3,705,955 | 12/1972 | Assouline et al. | 358/113 X |
| 4,087,688 | 5/1978 | Keller | 250/342 |
| 4,315,150 | 2/1982 | Darringer et al. | 374/124 |
| 4,343,182 | 8/1982 | Pompei | 374/124 X |
| 4,343,534 | 8/1982 | Gruskin | 350/319 |
| 4,420,265 | 12/1983 | Everest et al. | 374/124 X |
| 4,420,688 | 12/1983 | Le Bars | 250/353 X |
| 4,566,808 | 1/1986 | Pompei et al. | 374/124 |

OTHER PUBLICATIONS

Land, "Surface Pyrometers and Thermometer", Product Data Sheet 57, PDS 57/113, 1979, 1 page, England.
J. M. Rucklidge, "A Beginner's Guide to Infra-Red Thermometers", 1979, pp. 9.1, 9.2, 9.2a, 9.2b.
The Engineering Staff of Analog Devices, Inc., "Nonlinear Circuits Handbook", p. 95, D. H. Sheingold.

*Primary Examiner*—Daniel M. Yasich
*Attorney, Agent, or Firm*—Hamilton, Brook, Smith & Reynolds

[57] ABSTRACT

A hand held radiation detector may be used for scanning of a surface from a distance to obtain a gross indication of temperature variations in the surface. The radiation detector is provided with a nosepiece having a conical cup therein which can be placed directly against a surface. The radiation sensor views the surface through the cup to obtain an accurate indication of temperature substantially independent of the emissivity of the surface. The radiation sensor and a temperature sensor are potted with high conductivity material in an insulating sleeve within the nosepiece. The nosepiece is of high conductivity material and is thermally connected to a main housing which serves as a heat sink. Temperature indications are obtained from the sensed radiation indication by means of a piecewise linear gain analog circuit.

27 Claims, 7 Drawing Figures

RADIATION DETECTOR HAVING TEMPERATURE READOUT

FIELD OF THE INVENTION

The present invention relates to radiation detectors and in particular to such detectors used to provide temperature readings.

BACKGROUND

Many devices are available for providing indications of temperature of surfaces. The most accurate of those devices are generally contact devices such as thermistors or thermocouples which must be placed in physical contact with the surface, a disadvantage in some applications. A further disadvantage of such temperature sensors is that they generally require an amount of time in the order of seconds to stabilize to the temperature of the surface.

Radiation detectors have been used as a noncontact alternative to such temperature sensors. Such detectors are based on the principle that the thermal radiation emitted from a surface is proportional to the temperature of the surface raised to the fourth power. Typically radiation sensors much as thermopiles respond to changes in radiation in the order of one tenth second. Unfortunately, the radiation emitted is also a function of the emissivity of the surface and of background radiation. Because the emissivity of the surface is generally not accurately known assumptions must be made, and those assumptions lead to inaccuracies in the temperature reading.

A more rapid and accurate temperature reading can be obtained with a radiation sensing device which further includes means for eliminating the effects of emissivity on the output. This has been accomplished by means of a high reflectivity hemispherical cup which is placed against the surface. Radiation from the surface is detected through an aperture in the cup. By reflecting all emissions from a target surface back onto that surface, the cup causes the surface to behave as a black body, the emissivity of which is equal to one, regardless of the actual emissivity of the surface. With such an arrangement, the temperature can be rapidly detected by a thermopile which may come to equilibrium in less than a tenth of a second and assumptions with regard to emissivity are unnecessary.

DISCLOSURE OF THE INVENTION

The present invention relates to an improved radiation detector suitable for surface temperature measurements while negating the effects of surface emissivity. In order to minimize the effective emissivity of a cup through which the radiation sensor views the surface, while maintaining the desired effects of the cup and avoiding contact of the radiation sensor with the sensed surface, the cup is conical with opposite surfaces of the cone angled 60 degrees to 150 degrees from each other. The field of view of the radiation sensor is less than the angle of the conical surface so that the radiation sensor only views the target surface.

The conical surface is of high reflectivity (low emissivity) material. For small errors in temperature reading, the effective emissivity of the conical surface should be less than 0.20. The effective emissivity of the conical surface is approximately equal to the product of (1) the ratio of the reflective surface area to the target surface area and (2) the sum of the actual emissivity of the reflective surface plus the ratio of the aperture area to the reflective area plus the ratio of the area of any gap between the two surfaces to the reflective area.

The cup should also be of a material having high thermal conductance. With such material, the cup can be placed in contact with a very hot surface yet conduct the heat rapidly to a heat sink such as the detector housing without heating the radiation sensor. Heating of the radiation sensor would distort the measurement. Aluminum is the best material for the cup because it is of thermal conductance of over two watts per centimeter per degree Kelvin, can provide an effective emissivity of less than 0.20 and does not tarnish. Further, aluminum can be inexpensively machined without the need for plating which is vulnerable to wear.

With a small effective emissivity of the reflective surface, the actual temperature can be calculated electronically as the fourth root of the ratio of sensed radiation to the Stefan-Boltzmann constant. This computation is most readily performed by means of a piecewise linear approximation using a bank of linear gain analog circuits. A digital calculation method using a microprocessor device may also be employed.

Preferably, the conical depression is angled 120 degrees and has a base diameter of about one-half inch. A 60 degree field of view of the radiation sensor facilitates scanning of the surface for gross temperature measurements at short distances from the surface.

Although the half inch diameter cone is preferred for hand held scanning followed by surface contact, larger cones are preferred for accurate temperature readings where a small gap between the device and the surface being measured must be provided. For example, such a device is particularly suited to accurate and rapid temperature measurements of moving conveyors or webs.

With the conical cup at the end of a one-half inch to one inch extension on the radiation detector, the thermopile is most conveniently mounted within the cup extension by positioning the thermopile and an associated temperature sensor within a low thermal conductivity casing sleeve. Potting of the devices within the casing with a high conductivity material serves to maintain thermal equilibrium within the casing.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF THE PREFERRED EMBODIMENTS

A radiation detector 12 comprises a box-like housing 14. This housing has approximate dimensions of 3⅜ inches by 5 inches by ⅝ inch. A flat, hand held housing can be easily carried in a pocket. A radiation sensor assembly 16 is positioned at one end of the housing 14.

Figure 1:
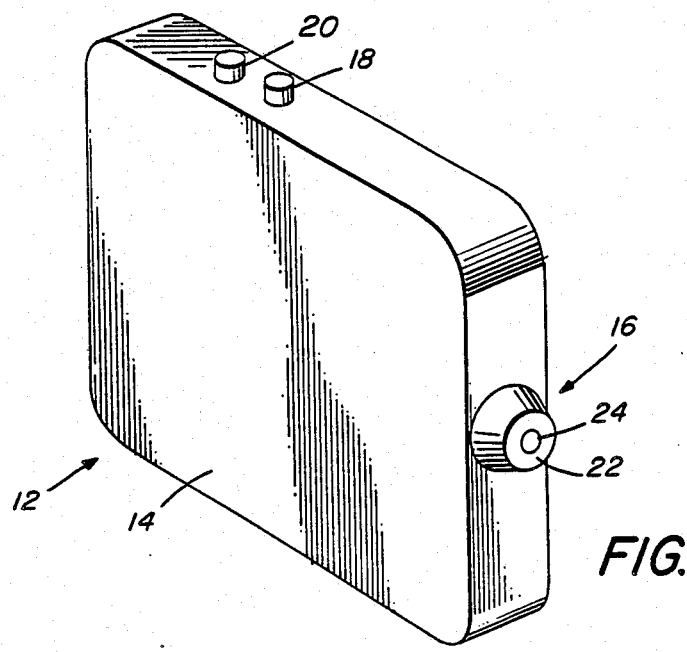
FIG. 1 is a perspective view of a preferred embodiment of the invention.

The unit can be used for scanning of a surface from a distance by directing the assembly 16 toward the surface. A digital display on the opposite end of the housing 14, not shown in FIG. 1, provides a digital readout of the approximate temperature of the surface being scanned. That temperature reading is only approximate because, when operating in this mode, the unit does not negate the effects of surface emissivity or environmental radiation. During scanning of the surface a button 18 on the top of the unit is pressed so that the digital readout varies with the temperature viewed by the radiation sensor. Alternatively, a button 20 can be pressed to lock the temperature reading. This is particularly useful when the unit must be positioned during a reading such that the display cannot be readily viewed by the user. The radiation sensor has a conical field of view of about 60 degrees. The field of view is determined by an aperture which serves as a field stop. That field of view is particularly suited to scanning at near distances of no greater than a few feet. Narrower fields of view may be provided for more distant scanning.

A conical cup 22 is formed in the nose of the radiation assembly. The radiation sensor views the target surface through a cup aperture 24 at the center of the cone. The cup aperture 24 serves as the field stop to set the field of view of the radiation sensor. The selection of an aperture which provides a 60° field of view is the result of several considerations. A large field of view advantageously increases the energy received at the sensor but disadvantageously increases the effective emissivity of the cup.

Figure 2:
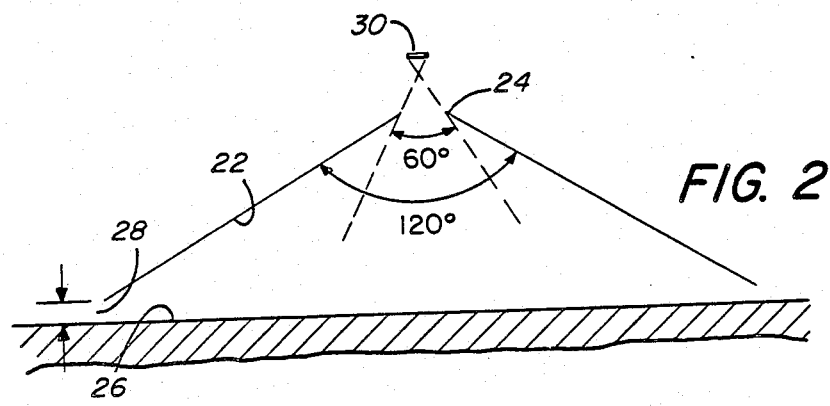
FIG. 2 is a schematic illustration of a target surface viewed through an aperture in a conical cup by a radiation detector.

Use of the unit of FIG. 1 for more accurate temperature measurements in which the effects of emissivity and background radiation are negated is best illustrated in FIG. 2. The cup 22 is preferably of high reflectivity aluminum to provide a highly reflective surface. The cup is positioned near or against a target surface 26, the temperature of which is to be measured. If the reflective surface absorbed no radiation from the target surface, that is its emissivity were zero, and there were no gap 28 between the reflective surface and the target surface and there were no cup aperture 24, all radiation from the target surface would be reflected back to that surface and would eventually be absorbed by the surface. Because the target absorbs all radiation within the cup, it behaves as a black body. Because it absorbs as a black body it must also emit as a black body. The small aperture 24 in the cone does not greatly detract from the black body characteristics of the target surface and allows that surface to be viewed by a radiation detector 30 through a field stop aperture 24.

The temperature of the surface can be computed from the detected radiation from the function $$T = (R/e\sigma)^{\frac{1}{4}} \qquad (1)$$

where R is the sensed radiation, $\sigma$ is the Stefan-Boltzmann constant and e is the emissivity of the target surface. Due to the reflective surface 22, it is assumed that the emissivity is equal to one. Therefore, temperature can be calculated directly from the detected radiation.

The accuracy of the temperature reading is dependent on the closeness to which the target surface 26 can be forced to behave as a black body which is in turn dependent on how close to totally reflecting the cup surface 22 can be made. The effective emissivity of the reflective surface is $$e_1 = \left(e_m + \frac{A_s}{A_1} + \frac{A_g}{A_1}\right) \frac{A_1}{A_2} \qquad (2)$$

where $e_m$ is the actual emissivity of the reflected surface material, $A_s$ is the area of the sensor aperture 24, $A_1$ is the reflective surface area, $A_g$ is the area of the gap 28 and $A_2$ is the target surface area.

In order to provide accurate temperature readings where the actual target surface emissivity is between, 0.8 and 1.0, within a two percent error, the effective emissivity of the surface 22 should be no greater than about 0.2.

It can be seen from equation 2 that the target surface 26 best approaches black body behavior with a small aperture area and a small gap area. Further, the ratio of the reflective surface area to the target surface area should be made as close to one as possible. The conical surface, as opposed to a hemispherical surface, minimizes the area of the reflective surface and thus brings that ratio closest to one. A wide angle cone tends to bring the ratio of the surface area closer to unity but is also more likely to allow an irregular target surface to come into close relationship with the radiation sensor and thus defeat the effects of the cone. Therefore, the angle of the cone should not exceed 150 degrees. On the other hand, decreasing the angle of the cone increases the surface area ratios and thus increases the effective emissivity of the surface 22. Therefore, the angle of the cone should not be less than 60 degrees. The 60 degree angle also keeps the cone out of the 60 degree field of view of the detector. Preferably, the cone is at about 120 degrees as shown in FIG. 2.

With a cone aperture of ⅛ inch, a 120 degree conical cone having a ½ inch base, and a cone surface of shiny aluminum which is not polished, the effective emissivity of the cone when the cup is placed directly against the target surface is about 0.20. That device provides a two percent error through a range of emissivities of 0.8 to 1.0. The same unit, having polished gold plating on the nose cup which provides an actual emissivity of 0.02 rather than the 0.1 emissivity of unpolished aluminum, reduces the effective emissivity of the cup to 0.04. That unit provides a plus or minus three percent error for target surface emissivities in the range of 0.2 to 1.0 and a seven percent error in the range of 0.1 to 1.0.

Figure 3:
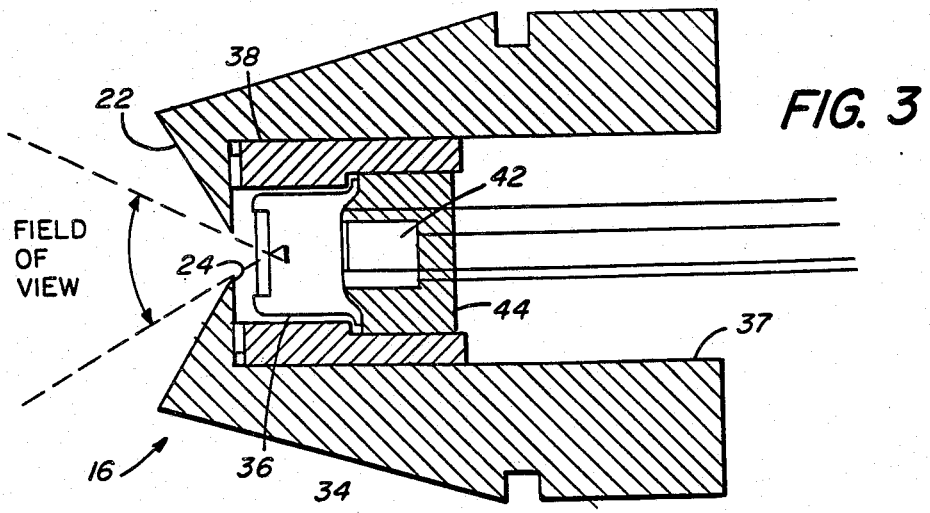
FIG. 3 is a longitudinal cross sectional view of the radiation sensor and associated conical cup in the device of FIG. 1 which is illustrated schematically in FIG. 2.

The detailed construction of the radiation sensor assembly 16 is shown in FIG. 3. The cup surface 22 is formed in an aluminum nosepiece extension 34. So that the radiation sensor can be positioned close to the cup aperture 24, it is positioned within a bore 37 in the extension 34. The radiation sensor 36 is mounted within a low thermal conductivity plastic sleeve 38. The insulating sleeve 38 isolates the radiation sensor and temperature sensor and their associated thermal mass from the aluminum nosepiece 34. Because the nosepiece 34 may be pressed directly against a high temperature surface, such as one of 500° F., its temperature can be expected to rise substantially.

A temperature sensor 42 is mounted in thermal contact with the radiation sensor 36 in order to provide temperature compensation. It is important that both the radiation sensor 36 and the temperature sensor 42 be in near thermal equilibrium with each other. To that end, they may be potted in a high conductivity potting material 44 within the low conductivity sleeve 38. The potting material 44 has sufficient thermal mass to quickly conduct heat generated in the sensor by thermal radiation away from the sensor while holding both the detector and temperature sensor at a relatively stable temperature.

In order that the temperature difference between the radiation detector and the temperature sensor contributes less than a 1% error, the gradient between the two should be less than 1% of the temperature difference between the radiation detector and the target surface. Thus, the thermal time constant presented by the high conductivity potting material 44 should be such that the temperature difference between the two devices is less than about 4 degrees for a target design temperature of about 500 degrees and thermopile temperature of about 100 degrees.

To minimize heating of the radiation sensor it is important that heat be conducted rapidly away from the portion or the nose piece adjacent to the radiation sensor. To that end, the nosepiece 34 is of high thermal conductivity material. Further, it is attached directly to a metal casing which forms the housing 14 and that casing serves as a large heat sink. In practice, it has been determined that by the time the radiation sensor 36 becomas sufficiently heated to distort measurements the casing itself becomes warm to the touch to serve as an indication to the user.

Machined aluminum is the preferred material for forming a cup surface 22 in a high thermal conductance nosepiece. In the past, gold plated cups have been utilized. Plating is necessitated by the cost of the gold. However, with plating there is the danger of wear of the low emissivity material with continued polishing. Material such as copper and silver would also provide the low emissivity and high thermal conductance required, but those materials tend to tarnish. Therefore, it has been found that aluminum, which can be readily machined at low cost, provides an effective emissivity of less than 0.2 and a sufficient thermal conductivity, is preferred. Of course, an aluminum alloy will generally provide the best mechanical characteristics. Even an alloy will be comprised substantially of aluminum, most likely over 90% aluminum.

The emissivity of even polished aluminum is not sufficiently low to enable accurate measurement of low emissivity surfaces. However, most surfaces of interest in temperature measurements are of higher emissivity. In fact, it is the recognition that most surfaces of interest have an emissivity of greater than 0.8 which allows for the use of aluminum and a small cup while still assuring a less than 2% error in measurements of surfaces of interest.

Most accurate temperature readings are provided when the nosepiece 34 is pressed directly against the surface being measured. However, a particularly useful application for the present invention is in measuring the temperature of a moving object. For example, a radiation detector 48 is shown suspended over a moving conveyor belt 50 by a mounting bracket 51. A small gap must be provided between the nosepiece 52 of the radiation detector and the conveyor belt to avoid interference with the moving belt. In order to maintain an effective emissivity of the reflective surface less than 0.2, where a gap is provided between the nose piece and the target surface, the base diameter of the cup must be enlarged somewhat. With a 0.1 inch gap using aluminum having an actual emissivity of 0.1, the base diameter of a 120 degree conical cup must be 6.25 inches. This size can be decreased by a factor of approximately two by using a very reflective gold surface.

Figure 4:
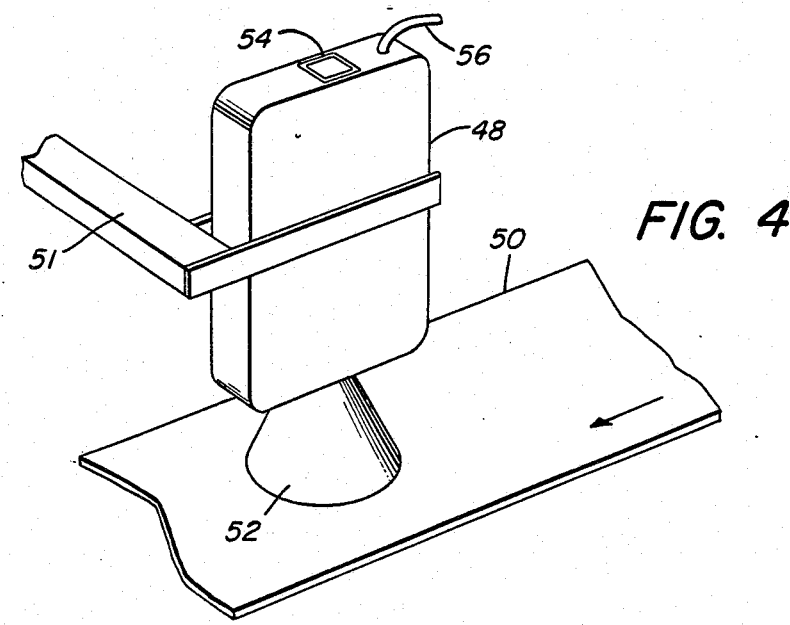
FIG. 4 is a perspective view of an alternative embodiment of the invention in which a radiation sensor views a moving conveyor behind a much larger conical cup.

Although the unit 48 has a digital readout 54, it is also provided with an output lead 56 which may be connected directly to process control electronics. The system of FIG. 4 provides very rapid temperature measurements of a moving surface without the need for contact of the surface yet without significant measurement errors due to changes in emissivity of the surface or to background radiation.

Figure 5:
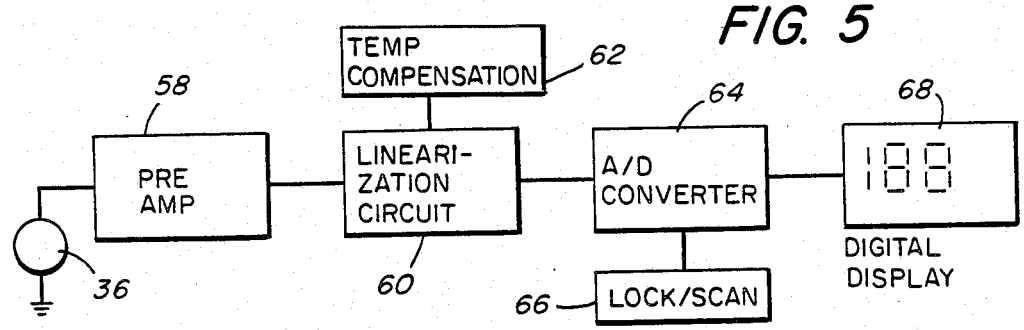
FIG. 5 is an electrical block diagram of the computation and display circuitry of the device of FIG. 1.

The circuitry required to provide the digital display on the radiation detector is shown in FIG. 5. The output of the radiation detector 36 is applied through a preamplifier 58 to a linearization circuit 60. In that circuit the sensed radiation signal is compensated to allow for radiation from the radiation sensor back toward the target. This compensation is a function of the temperature of the sensor 36 and that temperature is determined by the temperature sensor 42 of FIG. 3. The linearization circuit also computes the fourth root of the ratio of the sensed radiation to the Stefan-Boltzmann constant. The temperature indication provided by the linearization circuit 60 is applied to an analog to digital converter 64. The output of the converter 64 can be locked by the button 20 on the housing of the detector through a circuit 66. The digital indication of temperature is applied to a conventional digital display 68.

Figure 6:
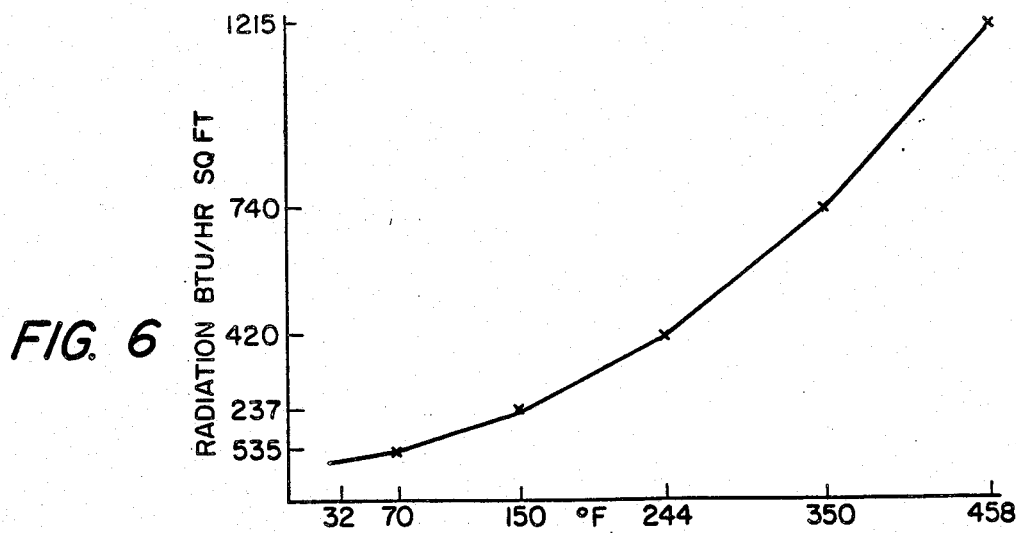
FIG. 6 is a graphical illustration of the piecewise linear approximation performed by the linearization circuit of FIG. 5.
Figure 7:
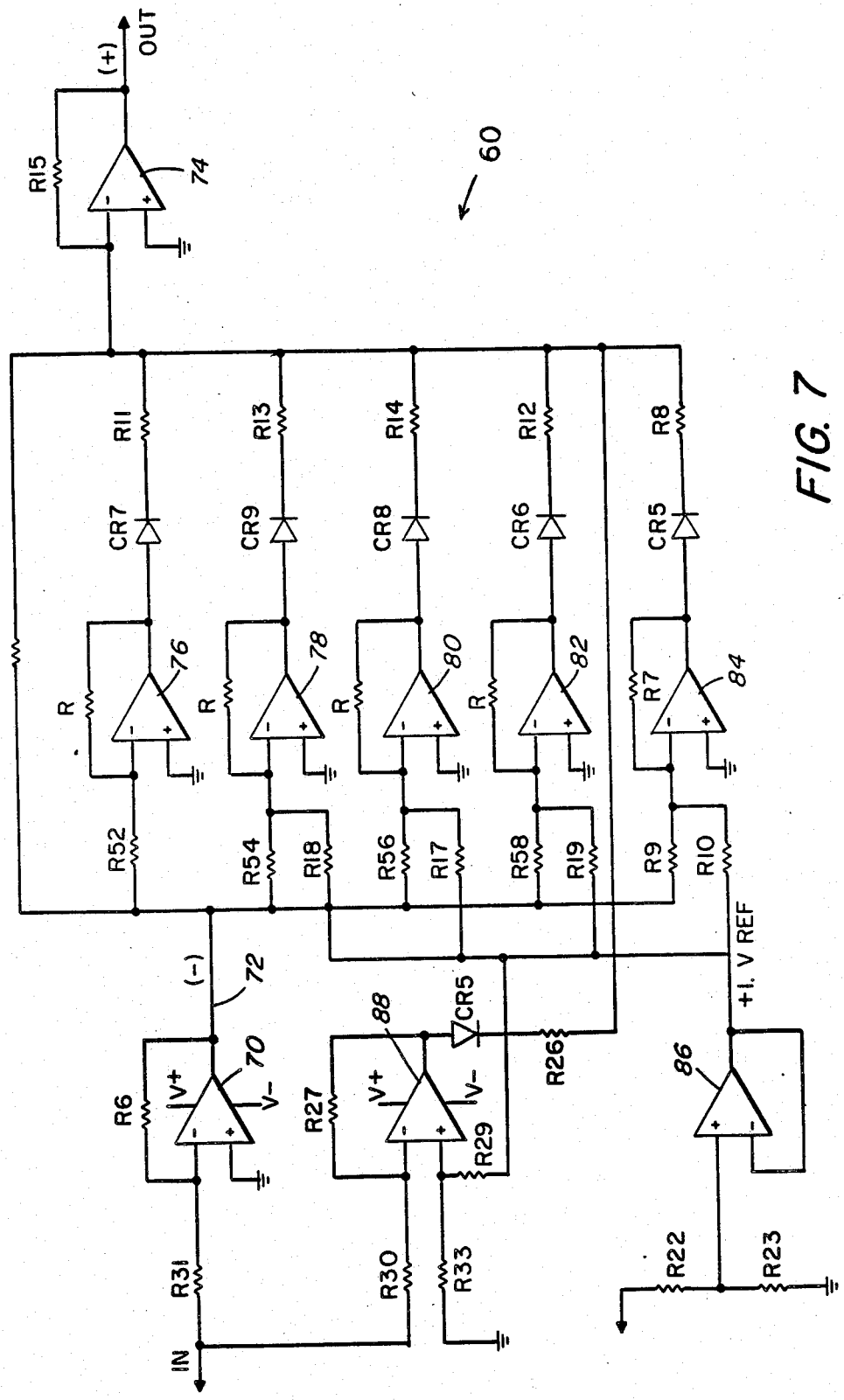
FIG. 7 is a detailed electrical, schematic of the linearization circuit of FIG. 5.

The linearization circuit converts sensed radiation to temperature by means of a piecewise linear approximation illustrated in FIG. 6. This piecewise linear approximation is performed by the circuit of FIG. 7.

The temperature signal is applied through a scaling amplifier 70 to produce a negative signal on line 72. That signal draws through a resistor R16 to generate a positive output from a summing amplifier 74. At temperatures below 70° F., a comparator 88 provides a positive output due to the positive input from a voltage divider R29, R33. The positive current through resistor R26 is summed with the negative current through resistor R16 at the input to the summing amplifier to set the slope of the curve of FIG. 6 below 70°. With increasing temperature, and thus an increasing input through resistor R30 at the input to the comparator 88, the comparator 88 adds less positive current. Finally, at about 70° F. comparator 88 shuts off completely and stops adding current to the summing amplifier 74.

If the remainder of the comparators 76, 78, 80, 82 and 84 remained off, the output from summing amplifier 74 would increase linearly with increases in the input to amplifier 70 due to negative current through resistor R16. However, as the voltage on line 72 becomes sufficiently negative to turn on comparator 76, that comparator begins to add a positive current to the more negative current passing through the resistor R16. As a result, although the output of amplifier 74 increases linearly with increasing inputs to amplifier 70, that increase is not as great. Similarly, when the current drawn through a resistor R54 surpasses that drawn through resistor R18 from the reference amplifier 86, the comparator 78 turns on and begins to conduct through its diode CR9 and resistor R13 to add to the still increasingly negative current through resistor R16. The result is that the output on comparator 74 continues to increase linearly but at a lesser rate with changes in detected radiation. Similarly, each of comparators 80, 82 and 84 begin to conduct at respective nodes of the piecewise linear function of FIG. 6.

While the invention has been particularly shown and described with reference to a preferred embodiment thereof, it will be understood by those skilled in the art that various changes in form and details may be made therein without departing from the spirit and scope of the invention as defined by the appended claims.

We claim:

1. A radiation detector comprising a nosepiece comprised substantially of aluminum, the nosepiece having a cup formed therein and a cup aperture in the cup, there being a radiation sensor positioned within, but thermally insulated from, the nosepiece behind the cup aperture and a temperature compensation sensor mounted in the nosepiece, wherein the cup eliminates the effect of the actual emissivity of the target surface by reflecting emissions from the target surface back to that surface in such a way that the target surface acts as a black body with emissivity of about 1.

2. A radiation detector as claimed in claim 1 wherein the base of the cup has a diameter of about ½ inch.

3. A radiation detector comprising:
a cup within a nosepiece having a low emissivity surface and a cup aperture at the center thereof, the nosepiece being of high thermal conductivity material;
a casing positioned within the nosepiece behind the cup aperture of low thermal conductivity material, concentric with the cup aperture; and
a radiation sensor positioned in the casing behind the cup aperture and having a field of view determined by the cup aperture which does not intersect the cup surface, wherein the cup eliminates the effect of the actual emissivity of the target surface by reflecting substantially all emissions from the target surface back to that surface causing the target surface to act as a black body with an emissivity of about one, and a temperature compensation sensor mounted in the nosepiece.

4. A radiation detector as claimed in claim 3 wherein the radiation sensor and the temperature sensor are potted within the casing by means of a high conductivity material.

5. A radiation detector as claimed in claim 3 wherein the cup is conical and has an angle of 60 degrees to 150 degrees between opposing surfaces.

6. A radiation detector as claimed in claim 3 wherein the nosepiece is connected to a thermal heat sink which is a main housing of the radiation detector.

7. A radiation detector as claimed in claim 3 wherein the nosepiece is comprised substantially of aluminum.

8. A radiation detector comprising:
a housing;
a radiation sensor within the housing;
a nosepiece which is an external part of the housing of the detector at the outer end of which is a cup made of low emissivity reflective material, the cup having an aperture therein and said radiation sensor being positioned behind the aperture, wherein the cup is a conical depression with the tip end of the conical cup pointing inward of said nosepiece toward said radiation sensor and the tip end forming an angle between 60 degrees and 150 degrees, the radiation sensor having a conical field of view with an angle less than the angle of the conical cup, and said cup eliminates the effect of the actual emissivity of the target surface by reflecting substantially all emissions from the target surface back to that surface, causing the target surface to act as a black body with emissivity of about one.

9. The radiation detector as claimed in claim 8 wherein the tip end of the conical cup is an angle of about 120 degrees and the base of the cup has a diameter of about one-half inch.

10. A radiation detector as claimed in claim 9 wherein the radiation sensor has a field of view of about 60 degrees.

11. A radiation detector as claimed in claim 8 wherein the effective emissivity of the conical cup equal to $$\left(e_m + \frac{A_s}{A_1}\right) \frac{A_1}{A_2}$$

is less than 0.02, wherein $e_m$ is the actual emissivity of the cup surface, $A_s$ is the area of the sensor aperture, $A_1$ is the area of the reflective material in the cup and $A_2$ is the area of the base of the cup.

12. A radiation detector as claimed in claim 11 further comprising an electronic circuit for computing the fourth root of the ratio of the sensed radiation to the Stefan-Boltzmann constant by means of a piecewise linear approximation in a group of parallel linear gain analog circuits.

13. A radiation detector as claimed in claim 8 wherein the nosepiece is of high thermal conductivity material and is connected to a thermal heat sink, a casing of low thermal conductivity material is positioned within the nosepiece behind the cup aperture concentric with the cup aperture, and the radiation sensor is position in the casing.

14. A radiation detector as claimed in claim 13 wherein the radiation sensor and a temperature sensor are potted within the casing by means of a high conductivity material.

15. A radiation detector as claimed in claim 13 wherein the thermal heat sink is a main housing of the radiation detector.

16. A radiation detector as claimed in claim 13 wherein the nosepiece is comprised substantially of aluminum.

17. A radiation detector as claimed in claim 8 further comprising an electronic circuit for computing the fourth root of the ratio of the sensed radiation to the Stefan-Boltzmann constant by means of a piecewise linear approximation in a group of parallel linear gain analog circuits.

18. A radiation detector as claimed in claim 8 in claim 1 wherein the nosepiece is comprised substantially of aluminum.

19. A radiation detector comprising a cup of low emissivity reflective material at the end of a nosepiece and having a cup aperture therein and a radiation sensor and temperature compensation sensor positioned behind the aperture, wherein the nosepiece is comprised substantially of aluminum and is theremally connected to a main housing of a radiation detector which serves as a thermal heat sink, the cup is a conical depression having a tip end angle between 60 degrees and a 150 degrees, the field of view of the radiation detector being less than the angle of the conical cup, the radiation sensor and tepmperature compensation sensor are mounted in a casing of low conductivity material which is positioned within the nosepiece behind the cup aperture, and said cup eliminates the effect of the actual emissivity of the targe surface by reflecting emissions from the target furface back to that surface so as to cause the target surface to act as a black body with emissivity of about 1.

20. A temperature sensor system for measuring the temperature of a moving surface comprising:
a radiation detector having a housing,
a cup of low emissivity reflective material at the end of a nose piece which is an external part of the housing the cup having an aperture therein and there being a radiation sensor positioned behind the aperture, wherein the cup is a conical depression having a tip end which forms an angle, between 60 degrees and 150 degrees, the radiation detector having a field of view less than the angle of the conical cup, and means for mounting the radiation detector such that a small gap is maintained between the base of the conical cup and the moving surface, the gap and the conical cup being dimensioned such that $e_1$ is less than 0.20 where $$e_1 = \left( e_m + \frac{A_s}{A_1} + \frac{A_g}{A_1} \right) \frac{A_1}{A_2}$$

where $e_m$ is the actual emissivity of the cup, $A_s$ is the area of the cup aperture, $A_g$ is the area of the gap, $A_1$ is the area of the reflective surface and $A_2$ is the area of the target surface adjacent to the cup, and said cup elminates the effect of the actual emissivity of the target surface by reflecting substantially all emissions from the target surface back to that surface causing the target surface to act as a black body with emissivity of about one.

21. A system as claimed in claim 20 wherein the nosepiece is of high thermal conductivity material and is connected to a thermal heat sink, a casing of low thermal conductivity material is positioned within the nosepiece behind the cup aperture concentric with the cup aperture, and the radiation sensor is positioned in the casing.

22. A system as claimed in claim 21 wherein the radiation sensor and a temperature sensor are potted within the casing by means of a high conductivity material.

23. A radiation detector as claimed in claim 21 wherein the thermal heat sink is a main housing of the radiation detector.

24. A radiation detector as claimed in claim 21 wherein the nosepiece is comprised substantially of aluminum.

25. A system as claimed in claim 20 further comprising an electronic circuit for computing the fourth root of the ratio of the sensed radiation to the Stefan-Boltzmann constant by approximation in a group of parallel linear means of a piecewise linear gain analog circuits.

26. A radiation detector as claimed in claim 20 wherein the nosepiece is comprised substantially of aluminum.

27. A method of scanning and detecting the temperature of a target surface comprising:
scanning the target surface from a distance with a hand held detector, the detector comprising a cup having a low emissivity reflective surface, an aperture therein, a radiation sensor positioned behind the aperture and a temperature compensation sensor, to obtain a gross temperature indication of the target surface which includes the effects of background radiation and the emissivity of the surface both detected by the sensor;
and placing the cup against the target surface to detect the actual temperature of the surface without the effects of background radiation and surface emissivity, the cup eliminating the background radiation and causing the radiation detected to be substantially independent of the emissivity of the target surface by reflecting substantially all emissions from the target surface back to that surface such that the target surface acts as a black body with emissivity of about 1.

* * * * *